US009440214B2

(12) United States Patent
Gaga (10) Patent No.: US 9,440,214 B2
(45) Date of Patent: Sep. 13, 2016

(54) DEVICE FOR PROCESSING DOMESTIC AND INDUSTRIAL ORGANIC WASTE

(71) Applicant: Zakrytoe Aktsionernoye Obschestvo "Finansovo-Promyshlennaya Gruppa 'Tezaurum'", Tomsk (RU)

(72) Inventor: Sergei G. Gaga, Tomsk (RU)

(73) Assignee: Zakrytoe Aktsionernoye Obschestvo "Finansovo-Promyshlennaya Gruppa 'Tezaurum'", Tomsk (RU)

( * ) Notice: Subject to any disclaimer, the term of this patent is extended or adjusted under 35 U.S.C. 154(b) by 432 days.

(21) Appl. No.: 14/183,095

(22) Filed: Feb. 18, 2014

(65) Prior Publication Data

US 2014/0161681 A1    Jun. 12, 2014

Related U.S. Application Data

(60) Division of application No. 12/861,776, filed on Aug. 23, 2010, now Pat. No. 8,691,053, which is a continuation of application No. PCT/RU2008/000636, filed on Oct. 6, 2008.

(30) Foreign Application Priority Data

Feb. 22, 2008    (RU) .................................. 2008107014

(51) Int. Cl.
*B01J 19/00* (2006.01)
*B01J 19/12* (2006.01)
(Continued)

(52) U.S. Cl.
CPC ................. *B01J 19/12* (2013.01); *B01J 6/008* (2013.01); *C02F 11/10* (2013.01); *C10B 19/00* (2013.01);
(Continued)

(58) Field of Classification Search
CPC ....... C10B 53/00; C10B 19/00; C10B 57/02; C10G 1/02
USPC .............................. 202/96; 422/186.01, 610
See application file for complete search history.

(56) References Cited

U.S. PATENT DOCUMENTS 5,330,623 A * 7/1994 Holland ................. B01J 19/126
 201/19
6,187,988 B1 * 2/2001 Cha ........................ A62D 3/178
 204/157.3

(Continued)

FOREIGN PATENT DOCUMENTS

RU    2100402 C1    12/1997
RU    2105245 C1    2/1998
(Continued)

OTHER PUBLICATIONS

International Search Report from International Application No. PCT/RU2008/000636 filed on Oct. 6, 2008, mailed on Jan. 22, 2009.

(Continued)

*Primary Examiner* — Nina Bhat
(74) *Attorney, Agent, or Firm* — Patentbar International, P.C.

(57) ABSTRACT

A waste processing system for producing hydrocarbons from domestic and industrial organic waste by pyrolysis includes carrying out the first and second pyrolysis stages, fractionating pyrolysis products and processing each fraction for producing useful products. The second pyrolysis stage is carried out simultaneously with the electromagnetic action produced on the pyrolysis products. The device for carrying out the method includes a two-sectional pyrolysis reactor. An electromagnetic source is arranged on the second section of the reactor. The output of the second section is connected to a system for dividing the vaporous pyrolysis products. The technical result consists in increasing the waste processing effectiveness and producing solid, liquid and vaporous fuel components.

12 Claims, 4 Drawing Sheets

(51) Int. Cl.
*C02F 11/10* (2006.01)
*C10B 19/00* (2006.01)
*C10B 53/00* (2006.01)
*C10B 57/02* (2006.01)
*C10G 1/00* (2006.01)
*C10G 1/02* (2006.01)
*C10G 2/00* (2006.01)
*F23G 5/027* (2006.01)
*F23G 5/20* (2006.01)
*B01J 6/00* (2006.01)

(52) U.S. Cl.
CPC ............... *C10B 53/00* (2013.01); *C10B 57/02* (2013.01); *C10G 1/00* (2013.01); *C10G 1/006* (2013.01); *C10G 1/02* (2013.01); *C10G 2/30* (2013.01); *F23G 5/027* (2013.01); *F23G 5/20* (2013.01); *C10G 2300/1003* (2013.01); *F23G 2204/20* (2013.01); *F23G 2209/26* (2013.01); *Y02E 50/32* (2013.01); *Y02W 10/40* (2015.05)

(56) References Cited

U.S. PATENT DOCUMENTS

| | | | |
|---|---|---|---|
| 6,398,921 B1 * | 6/2002 | Moraski | C02F 1/302 110/346 |
| 6,830,662 B2 | 12/2004 | Cha | |
| 7,927,465 B2 * | 4/2011 | Novak | A62D 3/178 204/157.15 |
| 7,951,270 B2 * | 5/2011 | Ludlow-Palafox | C10B 53/00 201/13 |
| 8,236,237 B2 * | 8/2012 | Elson | A62D 3/178 219/121.36 |
| 8,466,332 B1 | 6/2013 | Hemmings et al. | |
| 8,691,053 B2 * | 4/2014 | Gaga | C02F 11/10 201/19 |

FOREIGN PATENT DOCUMENTS

| | | |
|---|---|---|
| RU | 2182684 C2 | 5/2002 |
| RU | 2202589 C2 | 4/2003 |
| RU | 2213908 C1 | 10/2003 |
| RU | 2229060 C2 | 5/2004 |
| WO | 0233320 A1 | 4/2002 |

OTHER PUBLICATIONS

Soufer et al., "Biomassa Kak Istochnik Energii", Mir, 1985, pp. 104, 169, Moscow.

Balaika et al., "Protsessy Teploobmena V Apparatakh Khimicheskoy Promyshlennosti", Mashgiz, 1962, p. 187, Moscow.

* cited by examiner

DEVICE FOR PROCESSING DOMESTIC AND INDUSTRIAL ORGANIC WASTE

RELATED APPLICATIONS

This application is a Divisional of U.S. application Ser. No. 12/861,776, filed on Aug. 23, 2010, which, in turn, is a Continuation of International Application No. PCT/RU2008/000636 filed on Oct. 6, 2008, which claims priority to Russian Patent Application No. 2008107014 filed on Feb. 22, 2008, all of which are incorporated herein by reference in their entirety.

FIELD OF THE INVENTION

The invention relates to waste processing and producing hydrocarbons from domestic and industrial organic wastes by pyrolysis. The inventions can be used for disposal of domestic, agricultural and industrial wastes of organic origin to obtain bio-gas, liquid petroleum and solid fuel components in the process of recycling

BACKGROUND OF THE INVENTION

Current methods of solving the problem of processing and recycling of household and industrial wastes, in particular such as manure, waste from meat processing, sawdust, peat, rubber, household waste (free of metals), etc., are largely based on approaches such as compaction and burial in landfills, biodegradation at the level of microorganisms and high-temperature treatment.

Given the increasing volume of waste, the principle of high-temperature breakdown becomes preferable, since burial in landfills and enzymatic decomposition of wastes require large areas and are not considered viable.

There is a well-known method of processing solid domestic and industrial wastes, including their preparation and involving loading of a vertical shaft furnace, fuel and hot air in the bottom of the shaft furnace, the discharge of pyrolysis gas and vapor components, resulting from combustion in the upper part of the furnace (Russian Federation Patent No. 2105245, MGZh R 23, O 5/00, published on Feb. 20, 1998).

A major shortcoming of this method is the not particularly high efficiency of the process of obtaining and using pyrolysis gas, due to the use of hot air as a gasifying agent, which leads to lower productivity of the recycling process.

A well-known method of processing solid domestic and industrial wastes, (Russian Federation Patent No. 2213908, MGZh R 23, O 5/00, published on Oct. 10, 2003) includes pre-processing and loading of waste into the reactor, heating, drying, pyrolysis and combustion with the formation of processed products in the gaseous and liquid phase and the discharge of processed products from a reactor. In this situation, heating, drying and pyrolysis are performed in a reactor at an absolute pressure of 0.08-0.095 MPa, and pretreatment is produced by grinding, mixing with the fusing agent and pressing.

The above method is significantly high-performance while being simultaneously an environmentally safe recycling process through a series of preliminary steps to treat waste and creating conditions for the intensification of the process. However, the process of waste destruction is not sufficiently effective in terms of safety and technological effectiveness of the process.

There is a known installation for processing organic material into fuel components (Russian Federation Patent No. 2182684, MGZh R 23, O 5/027, published on May 20, 2002), containing the means for feeding raw materials, a pyrolysis reactor equipped with an annular combustion chamber, a system of separation of the vaporous mixture, and facilities for removal. Placing an annular combustion chamber directly in the pyrolysis reactor leads to higher efficiency of the process, but in this installation, the waste destruction process does not allow for high-quality processing of waste because the structure of the reactor is not designed for use with high temperature pyrolysis.

The closest in technical nature and achieved results to the claimed group of inventions is a method and device for producing hydrocarbons from domestic garbage or waste and/or organic waste materials (Russian Federation Patent No. 2,202,589, MGZh R 23, O 5/027, published on Oct. 10, 2003) by two-stage cracking at different temperatures with successive loading and removal.

The above method includes a stage of loading the wastes in a horizontal rotary reactor for the first cracking reaction, loading the residual from the first cracking reaction with a helical stirrer into the second cracking reaction. This cracking is pyrolysis reaction and/or catalytic cracking.

A device for implementing this method contains mostly a horizontal rotating reactor and a reactor with a helical stirrer.

The above method and device are more effective in terms of safety and technological effectiveness of the recycling process, since the cracking reaction is carried out in two stages in separate reactors at different temperatures. The absence of high temperatures during the first cracking reaction has positive impact on the first reactor.

However, this method for producing hydrocarbons from domestic garbage or waste, and a device for its implementation, are critical from the standpoint of efficiency of the waste breakdown process, including such aspects as the speed and quality, as well as the workability and safety of the recycling process. An additional factor influencing the quality of waste recycling is the presence of a rotating reactor. A rotating reactor is costly and difficult to build, and an effective destruction process under the influence of high temperatures depends on complying with the safety conditions of the process, defined by the absence of deformation of the reactor at high temperatures.

These problems can be solved with the aid of the claimed group of inventions.

BRIEF DESCRIPTION OF THE DRAWINGS FIGURES

The invention is explained by the following examples and drawings.

DETAILED DESCRIPTION OF THE PREFERRED EMBODIMENT

The main objective of the claimed group of inventions is to create a method and a device for processing domestic and industrial waste organic materials so as to improve the quality of the waste recycling process, as well as to more fully recycle and extract useful products, such as liquid and gaseous hydrocarbons, and solid products.

Technical result is efficiency and reliability through a process of enhanced recycling in two stages combining the various effects on raw materials—pyrolysis and electromagnetic action—allowing faster and more complete breakdown of waste as well as the best way to divide and structure the various useful output products.

This problem is solved by the fact that in this method of processing municipal and industrial organic wastes, which includes the first and second stage of pyrolysis, division of pyrolysis products into fractions, and processing of each fraction for useful products, the second stage of pyrolysis is carried out with simultaneous electromagnetic action on the pyrolysis products.

It is preferable to perform periodic electromagnetic action using an electrical discharge with a voltage breakdown level of 10 to 50 kV with a frequency of discharge from 3 to 500 Hz.

Preferably both stages of the pyrolysis are carried out in a stationary reactor divided into two parts, in which the primary pyrolysis is executed at a temperature of 200-300° C. and the secondary is executed at 400-1200° C.

Separation of the pyrolysis products into fractions is done by removing liquid hydrocarbons from water, removal of gaseous products, their cooling and condensation, and discharge of solid products from the reactor.

Preferably, domestic and industrial wastes of organic origin should be subject to pre-processing, which includes, for example, grinding and mixing.

The best way to perform waste processing is with a catalyst that is chosen depending on the composition of the waste at a ratio of 2% to 15% of the mass of waste.

In this regard, sodium alkali is the optimum catalyst.

It is preferable to perform pyrolysis with an excess of pressure in the range from 0.15 to 0.7 atm.

The issue is resolved by the fact that in the device for processing household and industrial wastes of organic origin, containing the pyrolysis reactor, which consists of two parts and a system of separation of steam/gas pyrolysis products, there is additionally introduced an electromagnetic source mounted on the second part of the reactor, which is connected to the discharge system of separation of the steam/gas pyrolysis products.

Preferably, the pyrolysis reactor is stationary.

The device may also include a site for preparation of raw materials, coupled with the first part of the reactor, which can be made in the form of an extruder.

It is preferable to provide a device unit for removing solid product in the form of gas-tight slide valves.

The system for separation of steam/gas pyrolysis products may include a steam/gas mixture condenser, which is its supply, a burner unit, and a unit for the separation of liquid media, all connected to the steam/gas mixture condenser.

The first part of the reactor is preferably made as a receptacle, sealed outer cylinder and inner cylinder, which contains a conveyor screw with variable pitch with a hollow shaft, which is connected to a drive, where the hollow shaft has supply and discharge tubes for the conveyor screw, a helical guide is located between the inner and outer cylinders, the outer cylinder has a group of tubes to supply and discharge hot gases, and the discharge tube is connected with the internal cylinder The second part of the pyrolysis reactor can be made in the form of a sealed outer cylinder and inner cylinder containing a conveyor screw located on the shaft, connected to the drive, where a helical guide is located between the inner and outer cylinders, the outer cylinder contains a group of supply and discharge tubes for hot gases, and the inner cylinder contains a tube with a flange for connection to the first part of the reactor, a discharge tube for vapor gases and a tube to remove solid products.

The best source of electromagnetic action is in the form of a generator connected to the group of discharge devices installed on the tube with a flange for connection to the first part of reactor.

It is preferable to make the steam/gas mixture condenser in the form of inner and outer cylinders, between which there is a helix for the circulation of steam/gas steam/gas mixture, and to make the inner cylinder with tubes containing coolant supply and discharge tubes and the outer cylinder with supply tubes for supply and discharge of vaporous products and a tube for discharge of liquid products, while the outer cylinder is made with a casing that has tubes installed for supply and discharge of cooling liquid.

It is best to provide heat insulation for the first and second parts of the reactor.

Preferably the conveyor screw in the second part of the reactor is made bladed.

The claimed method and devices can improve the efficiency of the recycling process by improving the processing of waste and accelerating its breakdown.

This is achieved by using electromagnetic action in the process of pyrolysis that makes it possible to accelerate the breakdown process, better process waste, and improve the reliability of separation of different fractions of hydrocarbons.

The claimed device in the preferred configuration has no rotating reactor, which is complex to manufacture and is very expensive, because it is difficult to seal at such a scale and it is critical in terms of environmental parameters. It is also difficult to clean the walls of the resultant carbon residue in the rotary reactor.

Waste processing in two stages enables increasing the safety of the process and making the transition to the electromagnetic action for processing products in solid and gaseous states in the second part of reactor.

In the claimed device, the design of the reactor in two parts, with inner and outer cylinders, improves structural rigidity, which in turn creates conditions for the use of a pyrolysis reactor with more intense heat loads. The presence of the helix between the cylinders further enhances the design and creates the opportunity for even heat distribution in the pyrolysis reactor.

At a lower temperature compared with the prototype of the first stage of pyrolysis, coke formation is absent and a huge volume of liquid hydrocarbons is produced, which improves the environmental desirability of recycling due to low carbon dioxide emissions.

The claimed method and device for processing household and industrial organic wastes are so interconnected that they form a single inventive concept.

Indeed, the device was created with an original design especially for the implementation of the method of processing waste, making it possible to provide quality and reliable waste processing.

Consequently, the claimed inventions meet the requirement of unity of invention.

AN EXAMPLE OF IMPLEMENTATION OF THE INVENTION

The device for recycling household and industrial organic wastes (FIG. 1) contains a pyrolysis reactor, consisting of the first (1) and second (3) units, steam/gas separation system (5) of the pyrolysis products, the electromagnetic action source (4), installed on the second part (3) of the reactor, the discharge of which is connected with the system (5) for separating steam/gas pyrolysis products. The pyrolysis reactor is made stationary.

Figure 1:
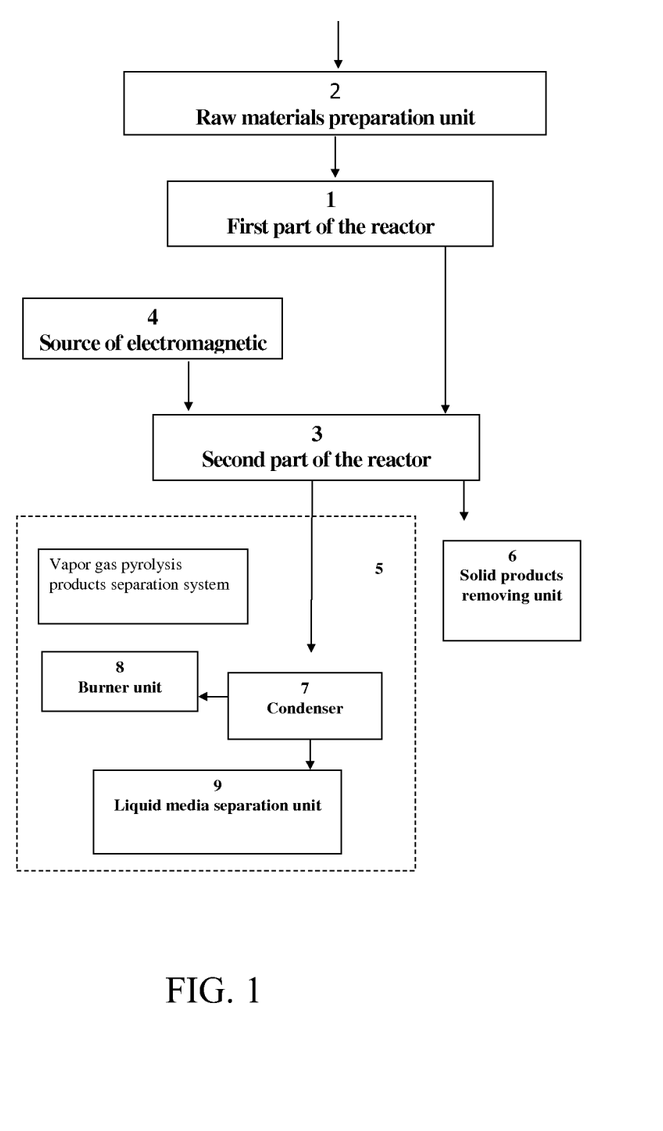
FIG. 1 schematically shows a block diagram of the device.

The device also contains a material preparation unit (2), connected to the first part of the reactor (1), which may be made in the form of an extruder.

The device is equipped with a unit for removing solid product (6), made in the form of gas-tight slide valves.

The system (5) for separating steam/gas pyrolysis products contains a steam/gas steam/gas mixture condenser (7), with its supply, a burner device (8) and a unit (9) for separation of liquid media, all connected to the steam/gas steam/gas mixture condenser (7).

Figure 2:
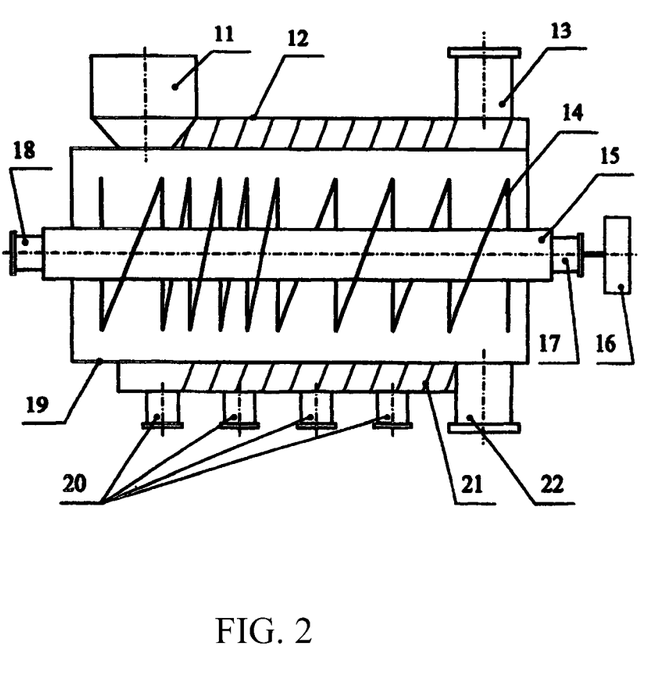
FIG. 2 shows the design of the first reactor.

The first part (1) of the reactor (FIG. 2) is designed as a receptacle (11), sealed outer cylinder (12) and inner cylinder (19). The inner cylinder (19) contains a conveyor screw (14) with variable pitch, which has a hollow shaft (15), coupled with a drive (16), where the hollow shaft has an supply (17) and discharge (18) connections for the conveyor screw, and a helical guide (21) is located between the inner (19) and outer (12) cylinder. The outer cylinder (12) has installed on it a group of branch tubes (20) for introducing hot gases and a drainage tube (13) for hot gases, and along with the inner cylinder (19) is connected to the exit tube (22).

The second part (3) of the pyrolysis reactor (FIG. 3) is made as a sealed outer cylinder (26) and an inner cylinder (34), containing a conveyor screw (29), located on the shaft (30), connected to the actuator (35). Between the inner (34) and outer cylinder (26) is a helical guide (32). The conveyor screw 29 is bladed. The outer cylinder (26) contains a group of inlets (33) for introducing hot gases and discharge tube (28) for hot gases, while the inner cylinder (34) contains a tube (25) with a flange for connection to the first part (1) of the reactor, a discharge tube (27) for vapor gases, and a tube (31) to remove solid products.

Figure 3:
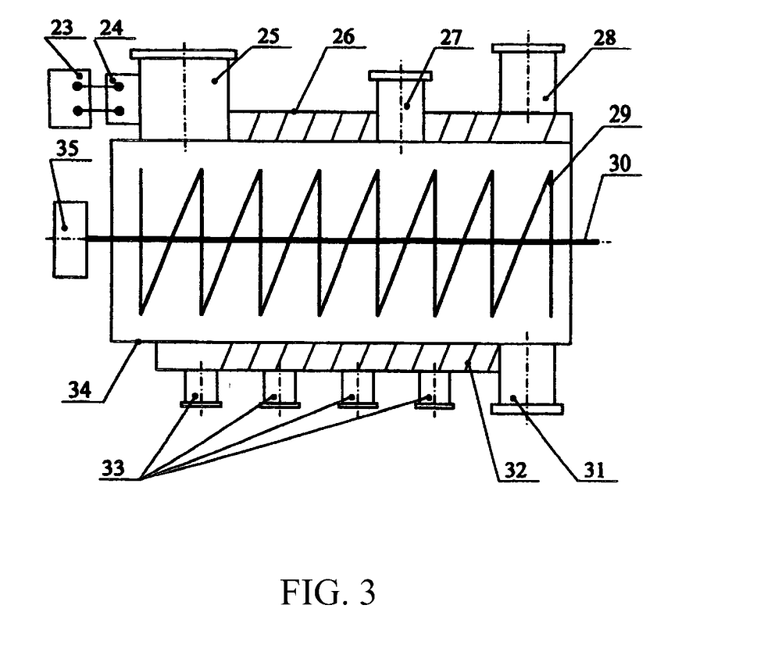
FIG. 3 shows the design of the second reactor.

The source (4) of electromagnetic action is made in the form of the generator (23), connected with the group of discharge devices (24), which is installed on the tube (25) with a flange, and serving as a connection to the first part (1) of the reactor.

The steam/gas mixture condenser (7) (FIG. 4) is in the form of the outer cylinder (43) and the inner cylinder (42), between which is a helix (36) for the circulation of the steam/gas mixture. The inner cylinder (42) is equipped with coolant supply (37) and discharge (38) tubes, a discharge tube (44) for liquid products, and the outer cylinder (43) is equipped with tubes (39), (45) for supply and discharge of vaporous products. The outer cylinder (43) is equipped with a casing (40), and this casing (40) is provided with coolant supply (41) and discharge (46) tubes.

The first and second parts of the reactor are equipped with a heater (not shown in the diagrams).

The device method and functions are as follows.

Domestic and/or industrial organic wastes in the form of particles with a diameter of more than 2.5 cm, such as animal bones or rubber products (tires, hoses, etc.), are subjected to pre-processing. This may be fragmentation of the waste in the raw material preparation unit (2) (FIG. 1), which is a standard industrial grinder, such as an extruder.

The fragmented raw material enters the receptacle (11) (FIG. 2) of the first part (1) of the reactor (FIG. 1).

If there is no need for pre-processing of waste (for instance: manure, sawdust or other waste with pieces of a diameter less than 2.5 cm), waste is fed with a catalyst such as sodium alkali into the receptacle (11) (FIG. 2) in the ratio of 2%-15% of the initial mass of waste. If pre-treatment of waste is applied, the catalyst is preferably added during raw material preparation process (2) for a more uniform distribution of the catalyst. Depending on the type of waste, the ratio is determined experimentally; for example, for meat-processing industry waste, the ratio of sodium alkali is 4-6% of the initial mass of waste.

Wastes are moved from the receptacle (11) to the inner cylinder (19) using a variable-step conveyor screw (14) (FIG. 2) in the first part (1) of the reactor (FIG. 1). The use of the conveyor screw with variable pitch (changing the conveyor screw pitch can be done in two ways: by changing the diameter of the conveyor screw shaft or changing the spacing) enables a water seal in the first third of the first part (1) of the reactor (FIG. 1), which seals the reactor and provides continuous waste feed capability.

The worm shaft (15) is made hollow with an inlet tube (17) for supplying heating gases and, correspondingly, a conveyor screw discharge tube 18 (FIG. 2) for removal of heating gases.

Such a design accelerates the process of heating waste in the first part (1) of the reactor. The hollow conveyor screw shaft (15) is driven by a drive (16), regulating the speed of rotation of the conveyor screw (14) with a variable step as necessary. The design of the first part (1) of the reactor, designed as an outer (12) and inner (19) cylinder, between which is a helical guide (21), makes for a unique heating chamber. The group of hot gas supply tubes (20) serves to introduce heating gases from the burner devices (not shown in the diagrams) for example, made in the form of gas burners, and a tube (13) is installed to divert hot gases. Heating gas supply to the supply tube group (20) and the tube (17) also can be made from the second part (3) of the reactor through a tube (28) for the discharge of hot gases, jointly from the burners and the second part (3) of the reactor. The helical guide (21) (FIG. 2) enables directing the flow of hot gases in a spiral around the inner cylinder (19), which provides uniform heating of structure of the first part (1) of the reactor. Such a heating configuration provides uniform linear expansion of metal structures envisaged in the design and manufacture of the reactor. In addition, such a structure of the first part (1) of the reactor can also strengthen the process of heat transfer from the managed heating chamber inside the reactor. Use of hot waste gases from the second part (3) of the reactor to heat the first part (1) of the reactor (FIG. 1) enables more complete use of the energy of these gases, which leads to more efficient use of the device. Using the variable-pitch conveyor screw (14), organic wastes are moved within the first part (1) of the reactor to the discharge tube (22) joining the first (1) and second (3) parts of the reactor, through which the pyrolysis products enter into the second part (3) of the reactor (FIG. 1). In the first part (1) of the reactor, organic wastes are subjected to low-temperature pyrolysis and heated to a temperature of 200-300° C. Setting the temperature within these ranges helps avoid coke formation on the walls of the first part (1) of the reactor and enables obtaining the maximum amount of liquid hydrocarbons.

Excess pressure in the range from 0.15 to 0.7 atm is maintained in order to avoid oxygen entering the reactor during both stages of the pyrolysis. Ensuring the hermiticity of the pyrolysis reactor is a challenge at higher pressures. It has been experimentally established that oxygen is very reliably prevented from entering the reactor at pressures higher than 0.15 atm.

The discharge tube (22) (FIG. 2) in the first part of a reactor is connected to the flange of tube 25 (FIG. 3) of the second part (3) of the reactor (FIG. 1). Electromagnetic action on the pyrolysis products in the second part (3) of the reactor is created by the source (4) of the electromagnetic action in the form of the generator (23), connected with the discharge device group (24), mounted on tube 25 (FIG. 3). It is preferable to apply periodic electromagnetic action, which is more effective for processing waste. Electromagnetic action is achieved by periodic electric discharge with a frequency from 3 to 500 Hz with discharge voltage of 10 to 50 kV. It has been experimentally established that depending on the choice of frequency, a varied qualitative composition of hydrocarbons can be achieved. The choice of the discharge voltage depends on the size of the pyrolysis reactor—the smaller it is, the lower the breakdown voltage.

The second part (3) of the reactor has a similar design to the structure of the first part (1) of the reactor. The inner (34) and outer (26) cylinders make up the heating chamber of the second part of the reactor (FIG. 3) and a spiral guide (32) passes between them. Hot gas for heating the second part (3) of the reactor enters a group of tubes (33) (FIG. 3) for connecting the burner devices (not shown on the diagrams). A blade conveyor screw (29) (FIG. 3) with a shaft (30) (FIG. 2) is used for moving and mixing the pyrolysis products in the second part (3) of the reactor (FIG. 1). The conveyor screw is powered by a drive 35 (FIG. 3) with the ability to change its speed of rotation, which enables smoothly adjusting the temperature inside the second part of the reactor. The second stage of pyrolysis is performed at temperatures ranging from 400 to 1200° C. By varying the temperature conditions inside the second part (3) of the reactor (FIG. 1), we can influence the qualitative composition of the pyrolysis products in both the steam/gas and solid phases. So higher temperatures yield a higher-quality solid product of pyrolysis, which can be used as sorbent. The optimum temperature conditions of pyrolysis were determined experimentally and are in the range from 600 to 900° C., which assures the best quality of the pyrolysis products and optimum use of the pyrolysis reactor. It was established experimentally that a temperature regime above 1200° C. increases the wear and tear of equipment and requires the use of specialized expensive materials.

Temperatures less than 400° C. during the second stage of pyrolysis do not provide a complete quality breakdown of waste. Discharge of steam/gas products of pyrolysis is done through a tube (27) (FIG. 3) mounted on the inner cylinder (34), and removal of solid waste products is done through the tube (31) in the solid products discharge unit (6) (FIG. 1).

Figure 4:
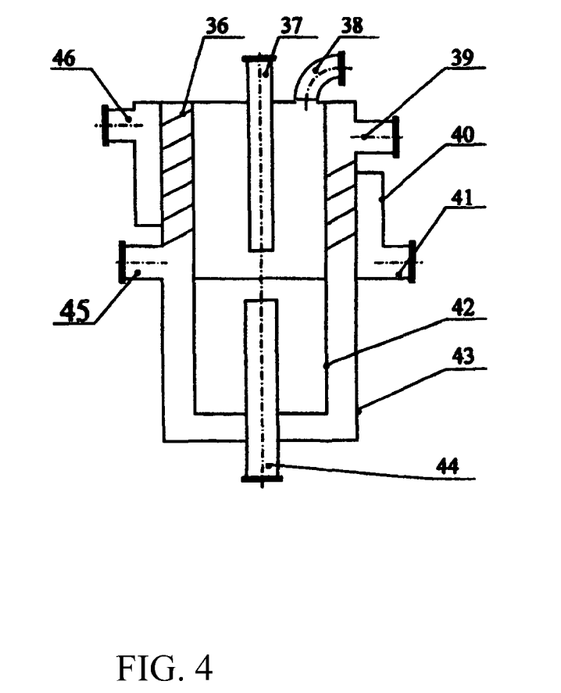
FIG. 4 schematically shows the design of the condenser vapor-gas mixture

The design of the conveyor screw (29) (FIG. 3) is bladed, which allows the pyrolysis gases to move freely inside the second part (3) of the reactor and out through the tube (27) (FIG. 3) connected with a system (5) for separating steam-pyrolysis products (FIG. 1) directly into the condenser (7) (FIG. 1) using the supply and discharge tubes for steam/gas products (39) or (45) (FIG. 4). The condenser (7) (FIG. 4), which can be made in the form of a group of condensers, is designed for cooling and condensing steam/gas pyrolysis products, as well as the isolation of gas/liquid media. The system (5) for isolating steam/gas pyrolysis products (FIG. 1) consists of a group of condensers (7) (FIG. 1), preferably six, connected in series and/or in parallel. The condenser (7) (FIG. 4) is in the form of two cylinders, one inserted into the other. A cooling casing (40) is attached to the outer cylinder (43) (FIG. 4) of the condenser. The casing has a tube coolant supply tube (41) and coolant discharge tube (46) and tubes (39) and (45) for the supply/discharge of steam/gas pyrolysis products.

Supply of coolant through a tube (37) and the discharge of coolant through a tube (38) is directed to the upper part of the inner cylinder (42) (FIG. 4) of the condenser (7). In the bottom of the cylinder, a water seal is made with the aid of a tube (44), enabling the removal of liquid pyrolysis products through the tube (44), and providing hermiticity for pyrolysis gases. Between the inner (42) and outer (43) cylinders is a helix (36), which provides movement of steam/gas pyrolysis products mixture along the spiral, which increases the duration that the steam/gas mixture of pyrolysis products are in the condenser and provides more intensive cooling. The resulting centrifugal forces are better able to remove the condensed liquid droplets from the vapor-gas flow of the pyrolysis products.

The condensers (7) are connected to a unit (9) for separation of liquid media (FIG. 1) with the liquid discharge tubes (44). In the liquids separation unit (9), liquid products of pyrolysis are collected and separated into components: liquid hydrocarbons and water pyrolysis products. The condenser (7) (if they are in a group, then the last one) is connected to a full-time burning unit (8) through the supply/discharge tubes (39) or (45) (FIG. 4), providing combustion of pyrolysis gases.

Experiments were performed with the test installation, according to the claimed method and device, a description of a specific implementation of which is presented in the examples.

Example 1

Recycling of meat and bone waste in the amount of 1000 kg with moisture content of 50 to 70% was performed under optimum operational conditions.

The first stage of pyrolysis was performed at temperatures of 250-300° C., while the second stage of pyrolysis was conducted at 750-850° C., with an excess pressure of 0.3 atm, a frequency of periodic electromagnetic action of 30 Hz, and a breakdown voltage of 30 kV.

A sodium alkali catalyst in a volume of 4% of waste was used.

Processing yielded the following results:
Solid product (coal dust, bulk density of 300-400 kg/m3, with a particle size of five microns and higher) 10%-13% of the waste mass.
10%-15% gaseous fuel product (about 20 components, including about 60% of hydrocarbons C1-C4)
About 20%-30% (depending on initial moisture content and waste composition) liquid containing hydrocarbons C6-C25 (70% of which was hydrocarbons C8-C16) and other organic compounds, including heterocyclic components with a maximum of 20 carbon atoms, with a qualitative composition similar to oil (paraffin-naphthenic-aromatic class).

Example 2

Recycling of meat and bone waste in the amount of 1000 kg, with moisture content of 50 to 70%. The first stage of pyrolysis was performed at temperatures of 200-250° C., while the second stage of pyrolysis was performed at 400-450° C., with an excess pressure of 0.15 atm, a frequency of periodic electromagnetic effect of 3 Hz, and breakdown voltage of 10 kV.

A sodium alkali catalyst in a volume of 2% of waste was used. Processing yielded the following results:
Solid product (coal dust, bulk density of 800-900 kg/m3, with a particle size of five microns and higher) 15-18% of the waste mass.

5-7% gaseous fuel product (about 20 components, including about 45% of hydrocarbons C1-C6)

About 25%-35% (depending on initial moisture content and waste composition) liquid containing hydrocarbons C8-C26 and other organic compounds (70% of which was hydrocarbons C10-C20), including heterocyclic components with a maximum of 22 carbon atoms.

Example 3

Recycling of meat and bone waste in the amount of 1000 kg, with moisture content of 50 to 70%. The first stage of pyrolysis was performed at a temperature of 300° C., while the second stage of pyrolysis was performed at 1100-1200° C., with an excess pressure of 0.7 atm, a frequency of periodic electromagnetic action of 400 Hz, and a breakdown voltage of 50 kV.

A sodium alkali catalyst in a volume of 10% of waste was used.

Processing yielded the following results:

Solid product (coal dust, bulk density of 200-300 kg/m3, with a particle size of five microns and higher) 9-11% of the waste mass.

13-17% gaseous fuel product (about 20 components, including about 55% of hydrocarbons C1-C3)

20-25% (depending on initial moisture content and composition of waste) liquid containing hydrocarbons C6-C20 and other organic compounds (65% of which was hydrocarbons C7-C14), including heterocyclic components with a maximum of 16 carbon atoms, and the qualitative composition of hydrocarbons also changed in terms of increasing the number of components.

INDUSTRIAL APPLICABILITY

The claimed group of inventions can be used for disposal of domestic, agricultural and industrial wastes of organic origin to obtain bio-gas, liquid petroleum and solid fuel components in the recycling process.

What is claimed is:

1. A device for processing domestic and industrial organic wastes comprising:
   a pyrolysis reactor comprising
      a first part adapted for performing a first stage of pyrolysis by pyrolytically processing the domestic and industrial organic waste, producing thereby pyrolysis products of the first stage;
      a second part adapted for performing a second stage of pyrolysis by pyrolytically processing the pyrolysis products of the first stage, producing thereby pyrolysis products of the second stage; and
      a system for separating the pyrolysis products of the second stage into fractions connected to an output of the second part of the pyrolysis reactor; and
   a source of electromagnetic action in communication with the second part of the pyrolysis reactor,
   wherein the source of electromagnetic action is adapted for electromagnetically acting on the pyrolysis products of the first stage simultaneously with their being pyrolized at the second stage.

2. The device according to claim 1, wherein the pyrolysis reactor is stationary.

3. The device according to claim 1, further comprising a unit for preparation of raw materials in the form of an extruder connected to the first part of a reactor.

4. The device according to claim 1, further comprising a unit for removing a solid product, the unit comprising gas-tight slide valves.

5. The device according to claim 1, wherein the system for separating pyrolysis products of the second stage into fractions comprises:
   a condenser having an input, the input of the condenser being an input of the system for separating pyrolysis products of the second stage into fractions;
   a burner device; and
   a unit for separating liquid products,
   wherein the burner device and the unit for separating liquid products are coupled with the condenser.

6. The device according to claim 1, wherein the first part of the pyrolysis reactor comprises a receptacle, a hermetic outer cylinder, and an inner cylinder having a conveyor screw with a variable pitch, having a hollow shaft connected to a drive, the hollow shaft comprising supply and discharge tubes for the conveyor screw, a helical guide being disposed between the inner and outer cylinders, the outer cylinder comprising a plurality of hot-gas supply tubes and a hot-gas discharge tube, and the internal cylinder being connected to a discharge tube.

7. The device according to claim 1, wherein the second part of the pyrolysis reactor is designed as a sealed outer cylinder and an inner cylinder comprising a conveyor screw disposed on a shaft connected to a drive; a helical guide being disposed between the inner and outer cylinders, the outer cylinder comprising a plurality of hot-gas supply tubes and a hot-gas discharge tube, the inner cylinder comprising a pipe with a flange for connecting to the first part of the pyrolysis reactor, as well as a discharge tube for steam/gas products and a discharge tube for solid products.

8. The device according to claim 7, wherein the conveyor screw of the second part of the pyrolysis reactor is bladed.

9. The device according to claim 1, wherein the source of electromagnetic action is made in the form of a generator connected to a group of discharge devices.

10. The device according to claim 9, wherein the discharge devices are installed on a tube connecting the first and second parts of the pyrolysis reactor.

11. The device according to claim 1, wherein the condenser comprises an outer cylinder and an inner cylinder, between which a helix is positioned to provide circulation of a steam/gas mixture, the inner cylinder being equipped with a coolant supply and discharge tubes, a discharge tube for liquid products and the outer cylinder being equipped with supply and discharge tubes for steam/gas products, the outer cylinder having a casing covering the outer cylinder, the casing being equipped with coolant supply and discharge tubes.

12. The device according to claim 1, wherein the first and second parts of the reactor are equipped with a heater.

* * * * *